Patented May 4, 1954

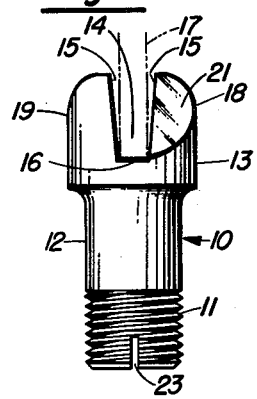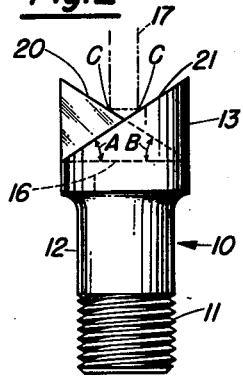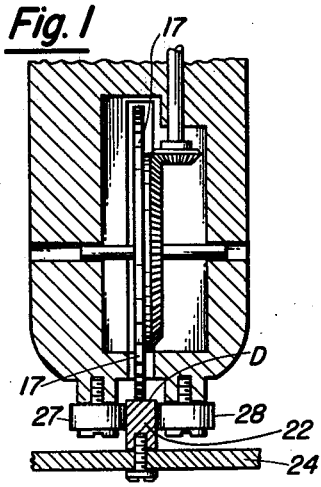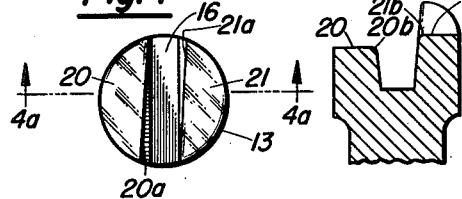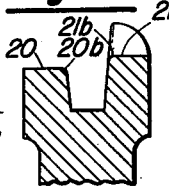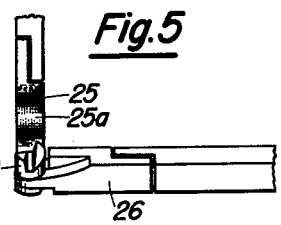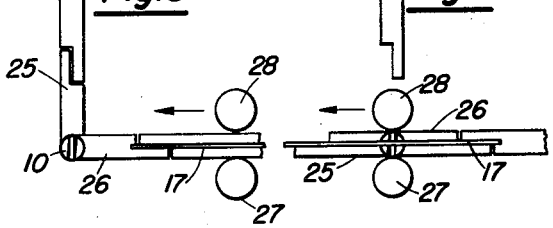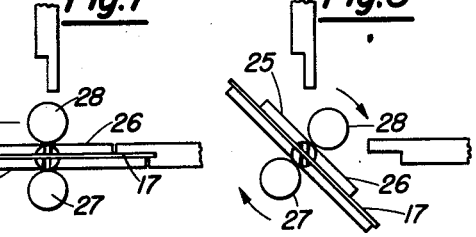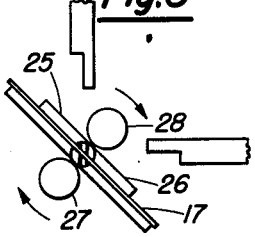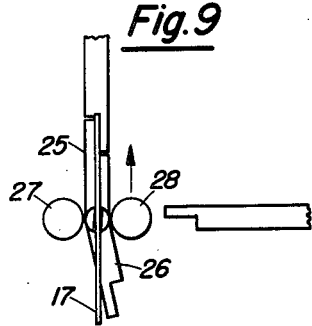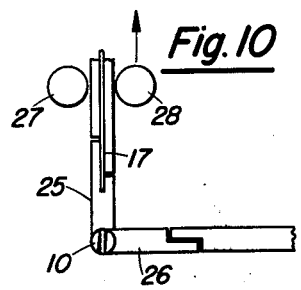

2,677,182

UNITED STATES PATENT OFFICE 2,677,182

SHAPE CUTTING DEVICE

Myron E. Barr, Alameda, Calif.

Application April 26, 1951, Serial No. 223,129

6 Claims. (Cl. 33—23)

(Granted under Title 35, U. S. Code (1952), sec. 266)

This invention relates to a template track of the type used to guide an automatic follower over a predetermined path as for controlling a cutting tool or torch to produce work pieces according to the shape of the template and more particularly the invention relates to a device for enabling the follower to make a sharp turn at a corner.

Template tracks of various types presently in common use cannot be made with angular corners because they are unable to guide a tracer wheel follower through a sharp turn. Hence they are unable to produce work pieces with sharp corners but only those with somewhat rounded corners.

It is an object of this invention to provide a template track that can be used to guide around a sharp or angular corner a follower controlling a cutting tool so that the cutting tool will reproduce on a work piece a sharp corner of the template. Additional objects will appear from and a better understanding of the invention can be had from the following description taken in connection with the accompanying drawing, wherein:

Fig. 1 is a cross-sectional view of a template track and an automatic follower including a tracer wheel and guide rollers in contact with the track;

Fig. 2 is an enlarged elevational view of a pivot post constituting an important part of a specific embodiment of the invention and shows in phantom the tracer wheel of an automatic follower in position to commence a sharp turn;

Fig. 3 is an elevational view of the pivot post taken at right angles to the view shown in Fig. 2 showing the follower tracer wheel, after it has completed its turn, in phantom in the slot cut into the upper part of the pivot post;

Fig. 4 is a top plan view of the pivot post of Fig. 2;

Fig. 4a is a cross section of the pivot post taken along the line 4a—4a in Fig. 4;

Fig. 5 is an axonometric view of a corner of the template track embodying the present invention showing the pivot post at the apex of the corner;

Fig. 6 is a generally schematic view showing the tracer wheel and track guide rollers approaching a corner of the template track;

Fig. 7 is a schematic view showing the tracer wheel and track guide rollers at the corner of the template track just prior to pivoting;

Fig. 8 is a schematic view showing the tracer wheel in the act of pivoting;

Fig. 9 is a schematic diagram showing the tracer wheel still at the corner of the template track but after it has completed a 90° turn; and Fig. 10 is a schematic diagram showing the tracer wheel after it has left the corner section of the template track.

Prior art apparatus of the type with which this invention is concerned, one specific example of which is shown in U. S. Patent 1,887,670, has been incapable of producing work pieces having sharp corners since the template tracks were made with slightly rounded corners to facilitate turning of the tracer or drive wheel used in the automatic follower to produce motion of the cutting tool.

The present invention achieves a sharp turning of the tracer wheel at the corner of a template track by the use of a pivot device located at the corner. The pivot device comprises structure providing a pair of surfaces spaced from each other generally in the direction of the segment of track furnishing ingress to the corner and inclined oppositely relative to one another transversely to the direction of the ingress track segment, the space between the surfaces being aligned with and forming a continuation of the egress segment of the track. Conveniently the structure can be a pivot post located at the corner of the track and having a slot cut across the top thereof dividing the upper portion of the post into two sections, the slot being aligned with the egress segment of track and being wide enough to accommodate the tracer wheel of an automatic follower. The tracer wheel, to execute a sharp turn, should, ideally, turn about the corner axis which is defined as the axis at the corner extending perpendicular to what may be generally designated as the plane or contact surface of the template track. There can then be designated as the plane of the slot a plane containing the corner axis and extending in the direction of the slot. The aforementioned pair of spaced surfaces are so formed and positioned that in resting against them both simultaneously the tracer wheel is subject to reaction forces from the surfaces constituting a couple tending to turn the wheel about the corner axis and that the wheel will readily turn and slip into the slot. To provide these surfaces on a pivot post a portion of the top surface of one of the aforementioned sections of the pivot post is so formed that the projection of the outline of its profile on the plane of the slot is a line inclined toward the trace marked on that plane by the bottom surface of the slot while a portion of the top surface of the other of the pivot post sections is so formed that the projection on the plane of the slot of the outline of its profile is a line inclined toward that trace in a direction opposite from the inclination of the first mentioned line. Stated from another point of view, the tracer wheel, in approaching the corner, rides onto a generally V-shaped section of track, the two arms of the V being spaced from each other in the direction of approach of the wheel and each arm extending generally transversely across the direction of the ingress segment of track.

For use with automatic followers having guide rollers disposed on opposite sides of the template track for the purpose of retaining the tracer wheel on the track, the ingress and egress corner segments of the track are made to be displaceable from the positions which they normally occupy when defining the contour of the template so that they will not impede the motion of the guide rollers when they pivot with the follower.

A preferred specific embodiment of the invention uses a pivot post 10, best shown in detail in Figs. 2, 3, 4, and 4a, and shown in its location at the apex of a corner of a template in Figs. 5 through 10. Although the pivot post can be made from stock of any shape so long as it provides the inclined turning surfaces, it is conveniently made of round stock with a threaded portion 11 that serves to fasten it to a pattern table, a shank portion 12 that serves as a hinge pin for the corner sections of template track, and an upper portion or head 13. The head 13 is provided with a diametric slot 14 which will constitute a continuation of the egress track section. This slot can be of any convenient cross-section but is shown as being wedge-shaped with converging sides 15 and a flat bottom 16. These track segments can be mounted for translation or for rotation about axes other than the corner axis, for example, axes parallel to the corner axis but conveniently they are mounted to turn about the corner axis itself. The bottom of the slot is sufficiently wide to accommodate a tracer wheel 17, shown in phantom in Figs. 2 and 3.

The two sections 18 and 19 of the head 13 created by the slot 14 are formed so that portions (in this embodiment the entirety) of their top surfaces 20 and 21 are oppositely inclined. These surfaces can be plane, convex, or concave and can be ruled surfaces or doubly curved surfaces. For simplicity of construction plane surfaces are preferable. The planes can be inclined relative to the plane of the slot or normal thereto, as in the illustrated form where this is apparent from the horizontality of the lines marked 20 and 21 in Fig. 4a. But in any event the surfaces chosen must be such that the projection on the plane of the slot of the outline of the profile of each, which can be regarded as being represented respectively by the lines marked 20 and 21 in Fig. 2, are oppositely inclined, as indicated at angles A and B, to the trace on the plane of the slot described by the bottom of the slot, which trace can be regarded as being represented by the line marked 16 in Fig. 2. The inclined surfaces are so arranged and the post so located that corresponding points C, C on the surfaces (which points are spaced from each other a distance equal to the thickness of the follower tracer wheel) where the tracer wheel 17 would bear on the surfaces are at substantially the same height as the top surface D of the template track 22 (Fig. 1) on which the tracer wheel rolls. The actual dimensions of the pivot post depend, of course, on the particular follower used.

The pivot post can obviously be made in any suitable way but quite conveniently by first filing or milling the slot 14 in a piece of round stock such as drill rod. The sections thus formed are filed, ground, or milled down to provide the inclined plane surfaces 20 and 21. These plane surfaces intersect the plane surfaces 15 constituting the sides of the slot in straight lines 20a and 21a, respectively, (Fig. 4) to form, ideally, sharp edges or corners oppositely inclined toward the bottom of the slot. Preferably these sharp edges are rounded off as suggested at 20b and 21b in Fig. 4a (but omitted for the sake of clarity from the other figures) to facilitate movement of the tracer wheel 17 during pivoting thereof. The head 13 of the pivot post is preferably hardened so that the tracer wheel will readily slip in pivoting even if the wheel is knurled. Construction of the post is completed by turning down a portion to form shank 12, threading the end 11, and cutting a screw-driver slot 23 in the latter. The post 10 can be fastened non-rotatably to a pattern table 24 (Fig. 1) in any suitable manner as by screwing it tightly into a threaded hole in the table.

Fig. 5 shows the pivot post constituting a preferred specific embodiment of the invention positioned at a corner of a template track having a novel arrangement of displaceable ingress and egress track segments to accommodate a follower of the type using guide rollers. The post 10 is screwed into a pattern table such as 24 in Fig. 1 (omitted for clarity from Fig. 5) and its shank portion 12 serves as a hinge pin for the egress corner segment 25 of the track and the ingress corner segment 26, both of which are provided with openings through which the shank freely fits so that they are free to rotate about the shank, i. e., about the corner axis. Conveniently the corner segments can be notched out to form rabbeted joints with their corresponding adjacent track segments. The post is oriented with its slot aligned with the egress track segment 25 which places it at right angles to the ingress track segment 26 since the illustrated embodiment is for accomplishing a 90° turn. Turns at corners having acute angles or obtuse angles can also be accomplished with the pivot device of the invention merely by altering the contour of the inclined turning surfaces such as 20 and 21 so that the tracer wheel can conveniently ride onto these surfaces from the ingress track segment and so that the torque exerted on the tracer wheel by the reactions of the surfaces is sufficient to turn the wheel until it can enter the slot.

*Operation*

Figs. 6 through 10 show schematically how the template track of the invention operates in conjunction with a follower of the type exemplified in Fig. 1 having a driven tracer wheel and guide rollers. Fig. 6 shows the tracer wheel 17 approaching the corner and being guided along the track by guide rollers 27 and 28. If the track is located on a horizontal pattern table the weight of the follower and its associated mechanism serves to maintain the tracer wheel in good contact with the top surface of the track. If the track is otherwise oriented, other means, such as springs or levers, can be used to maintain contact. The track is fastened to the pattern table by any convenient means such as screws (Fig. 1) and the pivot post 10 can be similarly fixed to the table with the corner track sections 25 and 26 freely rotatable about it. As mentioned hereinbefore, the table is omitted for clarity from Figs. 5 through 10. In Fig. 7 there is shown the position of the tracer wheel after it has been driven onto the head of the post 10 and the guide roller 28 has displaced the egress track segment 25.

While the tracer wheel 17 is on the head of pivot post 10 it bears against surfaces 20 and 21, the spaced, oppositely directed components of the reaction forces from which act on the wheel through points C, C (Fig. 2) exerting a torque on it about the corner axis. This torque causes the wheel to pivot sharply and also, of course, causes the guide rollers 27 and 28 simultaneously to pivot and push the track segments 25 and 27, respectively, so that they, too, rotate about the corner axis and pass through the position shown in Fig. 8. In the usual arrangement the follower is so mounted as to be capable of some motion in a direction perpendicular to the contact surface of the track and thus as the tracer wheel 17 continues to pivot it can and does sink to the bottom 16 of the slot under the urging of the weight or other force pressing the follower against the track and at this point, as shown in Fig. 9, the guide roller 27 has forced the egress track segment 25 back to its original position in alignment with the adjacent egress portion of track.

Continued driving of the tracer wheel 17 carries it along the bottom of the slot and up the gently ogee-curved portion 25a (Fig. 5) of the egress track segment 25 to the level of the main part of the top surface of the track where it continues its progress in the usual manner as evident in Fig. 10. Ingress track segment 26 is returned to its original position (Fig. 10) forming a continuation of the remainder of the ingress track.

Obviously many modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

What is claimed is:

1. A device of the character described for guiding a template follower tracer wheel through a sharp turn at a corner of a template track comprising a pivot post at the corner having a pair of oppositely inclined surfaces extending transversely to the direction of the segment of track providing ingress to the corner and spaced from each other in the direction of the ingress track segment, said surfaces constituting a generally V-shaped section of track serving as the extension at the corner of the ingress track segment; an ingress track segment mounted so as to be displaceable from the position it normally occupies when defining the contour of the template; and a track segment providing egress from the corner also mounted so as to be displaceable from the position it normally occupies when defining the contour of the template.

2. The device of claim 1 wherein the ingress and egress track segments are mounted for rotation about the corner axis.

3. The device of claim 1 wherein the ingress and egress track segments are hinged on the pivot post to turn about the corner axis.

4. A template track assembly having a sharp corner to be turned by a tracer wheel follower comprising a segment of track providing ingress to the corner, a segment of track providing egress from the corner, and a pivot post at the apex of the corner providing a pair of oppositely inclined surfaces spaced from each other in the direction of the ingress track segment so as to provide a slot between them and so as to impart a torque about the corner axis to a tracer wheel pressed with its periphery resting against both of said surfaces.

5. A device to facilitate sharp turning of a template track follower tracer wheel at a corner of the track comprising ingress and egress track segments hinged to turn about the corner axis and a pair of oppositely inclined surfaces spaced from each other in the direction of the ingress track segment so as to provide a slot between them and so as to impart a torque about the corner axis to a tracer wheel pressed with its periphery resting against both of said surfaces.

6. A device of the character described comprising a pivot post positioned at the apex of the corner of a template track having a slot across the top thereof aligned with the egress track segment and a pair of oppositely inclined surfaces spaced from each other by the slot and forming a continuation of the ingress track segment, said surfaces being of such contour as to exert a torque about the corner axis on a tracer wheel riding on and pressed against both said surfaces.

References Cited in the file of this patent

UNITED STATES PATENTS

| Number | Name | Date |
|---|---|---|
| 1,842,741 | Bengtsson | Jan. 26, 1932 |
| 1,887,670 | Benoit | Nov. 15, 1932 |
| 2,062,380 | Smith | Dec. 1, 1936 |
| 2,289,561 | West | July 14, 1942 |
| 2,421,827 | Boyd | June 10, 1947 |
| 2,502,648 | Hacker | Apr. 4, 1950 |

FOREIGN PATENTS

| Number | Country | Date |
|---|---|---|
| 138,281 | Great Britain | Feb. 5, 1920 |